United States Patent
Rovoletto

(10) Patent No.: US 10,655,662 B2
(45) Date of Patent: May 19, 2020

(54) CONNECTING DEVICE BETWEEN COMPONENTS OF A PIECE OF FURNITURE

(71) Applicant: CAR S.r.l., Padua (IT)

(72) Inventor: Stefano Rovoletto, Padua (IT)

(73) Assignee: CAR S.R.L., Padua (IT)

( * ) Notice: Subject to any disclaimer, the term of this patent is extended or adjusted under 35 U.S.C. 154(b) by 154 days.

(21) Appl. No.: 15/579,734

(22) PCT Filed: Jun. 7, 2016

(86) PCT No.: PCT/IB2016/053330
§ 371 (c)(1),
(2) Date: Dec. 5, 2017

(87) PCT Pub. No.: WO2016/199015
PCT Pub. Date: Dec. 15, 2016

(65) Prior Publication Data
US 2018/0172048 A1    Jun. 21, 2018

(30) Foreign Application Priority Data

Jun. 8, 2015    (IT) .................. 102015000021415

(51) Int. Cl.
*F16B 12/20*    (2006.01)
*A47B 96/06*    (2006.01)
(Continued)

(52) U.S. Cl.
CPC ........ *F16B 12/2027* (2013.01); *A47B 96/066* (2013.01); *F16B 12/46* (2013.01);
(Continued)

(58) Field of Classification Search
CPC .............. F16B 152/2027; F16B 152/46; F16B 13/068; F16B 2012/103; F16B 12/20; F16B 12/2027; A47B 96/066; A47B 2230/0033
(Continued)

(56) References Cited

U.S. PATENT DOCUMENTS 729,124 A * 5/1903 Boone .................... F16B 13/068
411/24
914,103 A * 3/1909 Berry ..................... F16B 13/068
411/24
(Continued)

FOREIGN PATENT DOCUMENTS

DE        29804267 U1    7/1999
DE     102009043179 A1    9/2011
EP       0 949 424 A2 *  3/1999

OTHER PUBLICATIONS

International Search Report and Written Opinion dated Sep. 13, 2016 for counterpart PCT Application No. PCT/IB2016/053330.
(Continued)

*Primary Examiner* — Roberta S Delisle
(74) *Attorney, Agent, or Firm* — Shuttleworth & Ingersoll, PLC; Timothy J. Klima

(57) ABSTRACT

A connecting device between components of a piece of furniture includes
a casing capable of being received in a first seat and in a second seat obtained respectively in a first and in a second component of the piece of furniture, and including a first and a second radially expandable region to engage respectively the first and the second component in correspondence of the first and the second seat,
a tie rod received inside the casing with axial sliding power towards and from a locking position, and including a first segment in enlarged section and a second
(Continued)

segment in enlarged section susceptible of engagement respectively with the first and the second region to determine a radial expansion of the casing when the rod is moved in the locking position, and an eccentric element arranged to engage a head of the tie rod and axially move it towards the locking position when the eccentric element rotates around its main axis.

16 Claims, 6 Drawing Sheets

(51) Int. Cl.
  *F16B 12/46* (2006.01)
  *F16B 13/06* (2006.01)
  *F16B 12/10* (2006.01)
(52) U.S. Cl.
  CPC .... *F16B 13/068* (2013.01); *A47B 2230/0033* (2013.01); *F16B 12/20* (2013.01); *F16B 2012/103* (2013.01)
(58) Field of Classification Search
  USPC ........................................ 411/32, 24, 33, 34
  See application file for complete search history.

(56) References Cited

U.S. PATENT DOCUMENTS

| | | | | |
|---|---|---|---|---|
| 3,469,869 A | * | 9/1969 | Ramakers | F16B 12/14 403/264 |
| 4,772,166 A | * | 9/1988 | Shamah | E04G 23/0222 405/259.3 |
| 5,664,900 A | * | 9/1997 | Matthies | B23B 51/0045 403/267 |
| 5,702,215 A | * | 12/1997 | Li | F16B 13/0866 411/21 |
| 5,772,353 A | * | 6/1998 | Grieser | F16B 12/2036 403/231 |
| 5,788,395 A | * | 8/1998 | Grieser | F16B 12/2036 403/231 |
| 6,908,252 B1 | * | 6/2005 | Rubano | F16B 12/2027 403/231 |
| 7,207,757 B2 | * | 4/2007 | Mengel | F16B 5/0092 411/24 |
| 10,280,960 B2 | * | 5/2019 | Giovannetti | A47B 96/066 |

OTHER PUBLICATIONS

International Search Report and Written Opinion dated Nov. 16, 2016 for related International Patent Application No. PCT/IB2016/053343.

* cited by examiner

CONNECTING DEVICE BETWEEN COMPONENTS OF A PIECE OF FURNITURE

This application is the National Phase of International Application PCT/IB2016/053330 filed Jun. 7, 2016 which designated the U.S.

This application claims priority to Italian Patent Application No. 102015000021415 filed Jun. 8, 2015, which application is incorporated by reference herein.

TECHNICAL FIELD

The present invention relates to a connecting device between components of a piece of furniture, having characteristics as disclosed.

STATE OF THE ART

In the production of furniture, and more generally of elements of furniture, it is known the use of connecting devices to connect the different components of furniture and tighten them, in particular via panels used as shelves or walls, in order to assemble the piece of furniture and/or to fix it in a room in the desired position.

In particular, the known connecting devices are those comprising a rod-shaped pin, fixed to its first end to a first of component of the piece of furniture, and an eccentric element, generally cylindrical shaped, which is inserted in a seat formed in a first component of the piece of furniture to engage a head of the rod protruding from the first component. The eccentric element is provided with coupling means of the tie rod head, so that as a consequence of the rotation of the eccentric element around its own axis, the rod is moved to the inside of the first connecting element, obtaining in this way the approach and the clamping of the two components of the piece of furniture.

This type of connecting device finds a preferred application in the union of a horizontal panel (shelf) with a vertical wall.

In one embodiment of the connecting device of the type indicated above, it is provided that the fastening of the tie rod in the seat of the first component if the piece of furniture is obtained by a coupling of the type with gusset.

In this case the end of the tie rod opposite to the eccentric head engaged in the element features a segment in enlarged section, typically with tapered profile, and the tie rod is received sliding inside a casing provided with a corresponding end radially expandable, so that the axial displacement of the rod caused by the rotation of the eccentric element determines the radial expansion of said end and its engagement in the seat of the component of the piece of furniture in which it is received.

The connecting devices of the type described above, however, have some drawbacks. A first drawback is the fact that, with the completed assembly, the eccentric element is visible in the second component of the piece of furniture.

Furthermore, the seat provided in the second component of the piece of furniture for the eccentric element housing has not negligible diameters, generally higher than 14 mm.

A second drawback of the connecting device according to the known technique is given by the fact that each connecting device is formed by at least two separate components, the eccentric element and the tie rod, which must be separately mounted on the respective components of the piece of furniture to be assembled.

This obviously involves a high possibility of loss of one of these components and a greater difficulty in their positioning in the assembly phase.

A third drawback is the fact that the connecting device does not exert a sufficient reciprocal clamping action of the two components of the piece of furniture.

OBJECT OF THE INVENTION

The problem underlying the present invention is that of making a device which is structurally and functionally conceived to overcome, at least in part, one or more of the limitations described above with reference to the cited prior art.

In this context, it is an object of the invention to provide a connecting device which is simple to use, which features optimal characteristics of tensile strength and that is achievable with a low cost.

Another object of the invention is to provide a connecting device which also allows an effective disassembly of the components of the piece of furniture.

A further object of the invention is to provide a connecting device which is applicable to most common thicknesses of panels currently used.

Another object is to provide a connecting device configured to perform an effective reciprocal clamping action of the two components of the piece of furniture.

This problem has been solved and these objects are achieved by a connecting device formed in accordance with the present disclosure.

BRIEF DESCRIPTION OF THE DRAWINGS

The characteristics and benefits of the invention will be more apparent in the detailed description of some examples of the preferred embodiments, illustrated only by way of non-limiting example with reference to the attached drawings in which.

DETAILED DESCRIPTION OF PREFERRED EMBODIMENTS OF THE INVENTION

Figure 1:
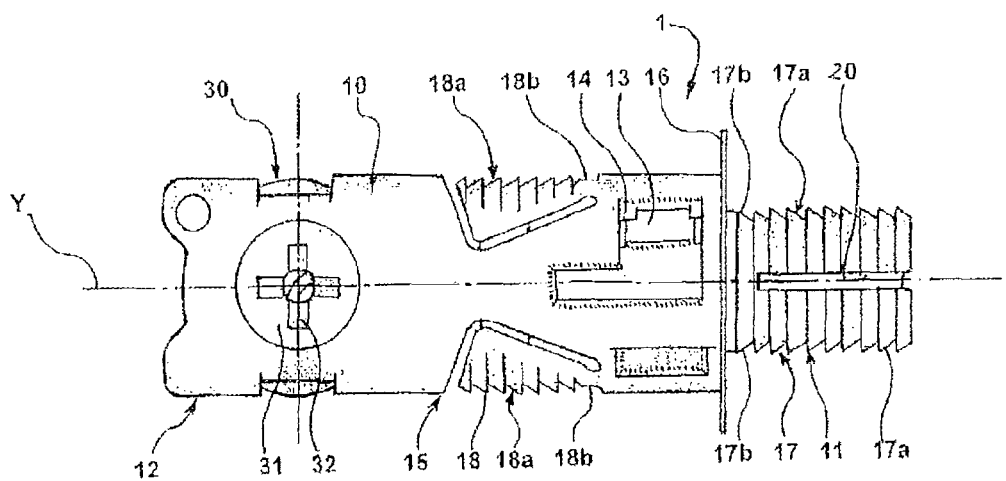
FIG. 1 is a schematic plan view of a first example of the connecting device according to the present invention.
Figure 2:
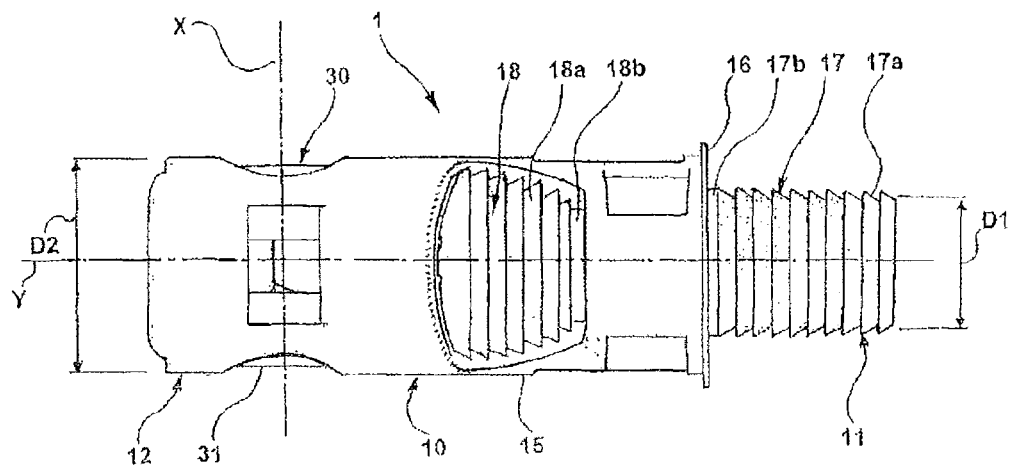
FIG. 2 is a schematic side view of the device of FIG. 1.
Figure 3:
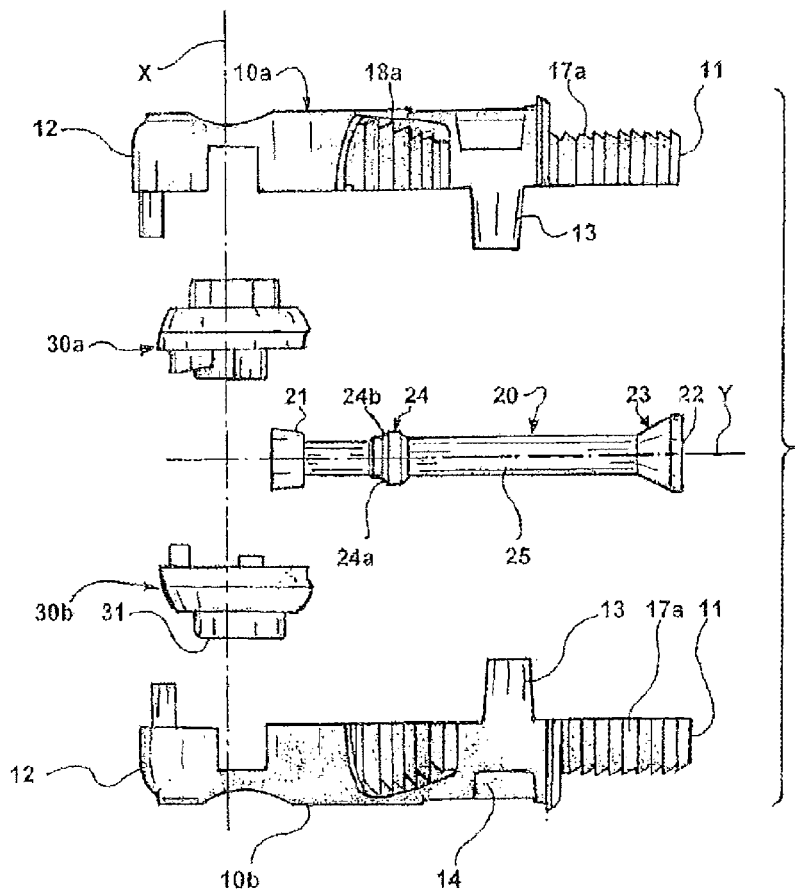
FIG. 3 is an exploded view of the device of FIG. 2, FIGS. 4 and 5 are longitudinal sectional views of the device of FIG. 1 in two different operating positions.
Figure 4:
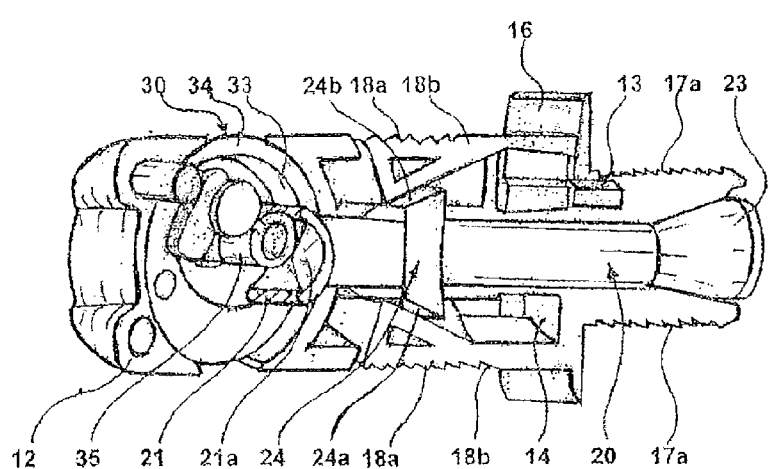

With initial reference to FIGS. 1 to 6, with 1 it is globally indicated a first example of the connecting device made in accordance with the present invention.

The connecting device 1 is arranged to mutually connect and tighten a first and a second component of a piece of furniture, respectively represented here in a generic manner by a first panel 2 and by a second panel 3, oriented in a perpendicular way to each other.

The panels are preferably made of wood-based material and have a thickness of between 12 mm and 30 mm, according to the most common construction standards in the furniture industry and furniture in general.

It is understood that the first and the second components of the piece of furniture can be made with different materials or shapes and can be positioned for the mutual coupling according to any other appropriate arrangement.

The connecting device 1 comprises a casing 10 inside which both a tie rod 20 and an eccentric element 30 of the tie rod 20 handling are accommodated.

The casing 10 is extended along a longitudinal axis Y of the connecting device 1 between a first end 11, capable of being received in a first seat 4 obtained in the first panel 2 of the piece of furniture 5 and a second end 12 capable of being received in a second seat 5 obtained in the second panel 3 of the piece of furniture.

The casing 10 is preferably made of plastic material, so as to be elastically deformable, and comprises a pair of shells 10a and 10b, mutually coupling in such a way as to enclose inside them the tie rod 20 and the eccentric element 30.

The shells 10a and 10b comprise two pairs of male and female 13, 14, even snap-in, locking elements which allow their mutual coupling.

In correspondence of the second end 12, the housing 10 has a section having a first diameter in correspondence of the first end 11, the casing 10 has a substantially cylindrical shape with circular section having a first diameter D1, while in correspondence of the second end 12 and a median region 15, the casing 10 has a substantially cylindrical shape with circular section having a second diameter D2 which is bigger than the first diameter D1.

Between the first end 11 and the median region 15 is provided an abutment flange 16, projecting radially, which is arranged to abut the first panel 2 or the second panel 3 when the first end 11 of the casing 10 is inserted in the first seat 4 or, respectively, when the second end 12 of the casing 10 is inserted in the second seat 5.

Preferably, the abutment flange 16 includes at least one protrusion or radial tooth, i.e. protruding away in the longitudinal axis Y of casing 10.

In the preferred embodiment, the abutment flange 16 includes two radial protrusions obtained by opposite sides of the casing 10, i.e. mutually protruding away.

Note that the two shells 10a, 10b have a surface area of mutual contact defining a median plane of the device, preferably passing through the longitudinal axis Y (defining the central axis of the device).

Preferably, the protrusions defining the flange 16 are placed so as not to intersect said median plane.

Therefore, protrusions are both anchored to only one of the shells 10a, 10b so as not to intersect said median plane. Preferably, said protrusions of the flange 16 have a first face lying on said median plane, i.e. coplanar with the area of contact of the respective shell 10a, and a second face spaced from the first one with a thickness equal to protrusion itself.

In this regard, preferably the second panel 3 of the piece of furniture has an elongated milling formed in a coupling face with the second panel 2, in which the first seat 5 is made (or vice versa).

Such milling is shaped to accommodate said flange 16, i.e. protrusions, in order to prevent the device from rotating around its longitudinal axis Y once inserted in the seat 5.

Advantageously, the fact that the flange 16 (i.e. protrusions) is off-cantered with respect to the median plane, i.e. it determines a central asymmetry of the device 1, obliges the user to put the device 1 with predetermined orientation, avoiding mounting errors.

According to a first aspect of the present invention, the casing 10 includes a first region 17 radially expandable to engage the first panel 2 in correspondence of the first seat 4, and a second region 18, also radially expandable, adapted to engage the second panel 3 in correspondence of the second seat 5.

Preferably, the first region 17 is defined by the first end 11 of the casing 10, and the second region 18 is defined by the median region 15 of the casing 10.

The first region 17 includes several tabs 17a, arranged side by side, separated by respective axial slots, so as to form a collar defining the first end 11 of the casing 10.

Preferably, the tabs 17a are articulated in oscillation around a respective end 17b of theirs facing the opposite side to the first end 11.

The second region 18 includes several tabs 18a, arranged on the diametrically opposite side of the median region 15 the casing 10, which are articulated in oscillation around a respective end 18b of theirs facing the first end 11.

Preferably, the outer surfaces of both tabs 17a and tabs 18a have a saw-tooth profile.

The tie rod 20 is also extended along the longitudinal axis Y, between a head 21 and a free end 22, and is preferably made of metallic material.

The tie rod 20 is received inside the casing 10 having limited possibilities of sliding along the longitudinal axis Y between a release position, in which the tie rod 20 is displaced towards the first end 11, and a locking position in which the tie rod 20 is more displaced towards the second end 12.

The tie rod 20 includes a first segment 23 in enlarged section susceptible of engagement with the first region 17 to determine the radial expansion of the casing 10 when the tie rod 20 is moved in the locking position.

Furthermore, the tie rod 20 includes a second segment 24 in enlarged section susceptible of engagement with the second region 18 to determine the radial expansion of the casing 10 when the tie rod is moved in the locking position.

Preferably, the first segment 23 is formed in correspondence of the free end 22, opposite to the head 21, while the second segment 24 is defined on a median segment 25 of the tie rod 20.

The first segment 23 has a conical profile conformation, progressively tapered starting from the free end 22 towards the head 21, and susceptible to encounter the tabs 17a.

In the preferred embodiment here described, the second segment 24 has a wedge-shaped conformation, with a pair of inclined planes 24a, 24b, tapered toward the head 21, which may encounter the tabs 18a.

Thanks to the conformation of the tabs 17a, 18a and of the segments in enlarged section 23 and 24, when the tie rod 20 is axially moved in locking position, tabs 17a and 18a are swung in opposite angular directions.

The eccentric element 30 has a generally cylindrical shape and is received inside the casing 10, in correspondence of its second end 12, with possibility of rotation around its main axis X, perpendicular to the longitudinal axis Y.

The eccentric element 30, preferably made of metallic material, is thus housed in the casing 10 and arranged to engage the head 21 of the tie rod 20 so as to move it axially towards the locking position as a result of an eccentric element 30 rotation around the main axis X. Preferably, the eccentric element 30 is formed by two shells 30a, 30b coupled together by means of one or more male-female couplings, in which the head 21 of the tie rod 20 is received in engagement.

Therefore, the eccentric element 30 has a lower bulk than the casing and is integrated to it, defining with it and the tie rod a single device, movable and storable individually.

The eccentric element 30 may have, in certain applications, a diameter significantly greater than its axial dimension. In these cases, it is preferable that, in correspondence of the second end 12 and of the median region 15, the casing 10 presents a substantially cylindrical shape with elliptical section, with minor axis parallel to the main axis X of the eccentric element 30.

This variant of the embodiment, not represented in the attached figures, is particularly suitable in applications where the connecting device has to be mounted on panels with a reduced thickness.

To favour the eccentric rotation of the element 30 around the main axis X, on a base 31 of the eccentric element 30 a seat 32 for a manoeuvring tool, such as a screwdriver has been obtained in a position aligned with the main axis X.

The base 31, in the area immediately surrounding the seat 32, is not coated by the casing 10 in order to allow its access from the outside.

Preferably, the eccentric element 30 defines internally a guide for the head 21 of the tie rod 20, more preferably a reversible drive.

More precisely, the eccentric element 30 is shaped to act reversibly in thrust on the head 21 of the tie rod 20 both in a first direction, towards the locking position, and in a second direction opposite to the first, towards the release position.

In particular, inside the eccentric element 30 there is a seat for receiving the head 21 delimited by a first segment 33 and a second active segment 35 obtained by opposite sides of the head 21 of the tie rod 20 and configured to encounter said head respectively as a result of a rotation of the eccentric element 30 around the axis X in a first direction or in a second direction, opposite to the first.

Therefore, the eccentric element includes a first active segment 33 engageable with the head 21 of the tie rod 20 and shaped to impart to the tie rod 20 an axial offset from the release position to the locking position following a rotation of the eccentric element 30 in a first rotating direction.

Moreover, the eccentric element 30 includes a second active segment 35 engageable with the head 21 of the tie rod 20 and shaped to impart to the tie rod 20 an axial offset from the locking position to the release position following a rotation of the eccentric element 30 in a second rotating direction, in opposition to the first.

Advantageously, in this way the head 21 of the tie rod 20 is always "guiding", i.e. it is constantly engageable by the eccentric element 30 allowing the reversibility of the expansion operation.

In the preferred embodiment, the first active segment is defined by a cam surface 33, formed on a curved projection 34, capable of encountering the head 21. The cam surface has a progressively decreasing distance from the main axis X, so that when the eccentric element 30 is rotated around the main axis X in a first rotating direction, the head 21 is dragged towards the inner part of the eccentric element 30, axially moving the tie rod 20 toward the locking position.

The head 21 advantageously has a U-shape with the concavity facing the main axis X. In addition, on the head 21 an extended countersink 21a in the direction of the main axis X and facing the base 31 is obtained.

Thanks to at least one of these characteristics, possible interferences with the tip of a manoeuvring tool used to rotate the eccentric element 30 and engaged in the seat 32 are avoided.

In accordance with this embodiment, the second active portion is preferably defined by an abutment element 35, capable of encountering the head 21 on the opposite side of the cam surface 33, in order to axially move the tie rod 20 away from the locking position when the eccentric element 30 is rotated around the main axis X in the direction opposite to the first rotating direction.

In the embodiment as described herein, the abutment element 35 is formed by an axially extended cylinder in an offset position with respect to the main axis X.

The connecting device is used in the assembly of panels 2 and 3 according the following mode.

The connecting device 1, with the tie rod 20 moved to the release position (FIG. 4), is axially inserted in the second seat 5 with the second end 12 of the casing 10 facing the bottom of the seat 5, until it abuts against the flange abutment 16.

The second seat 5 has an opening obtained on a side of the second panel 3 and extends parallel to the surface of the panel to an extent comparable to the axial dimension of the casing 10 from the abutment flange 16 to the second end 12.

The second seat 5 has a substantially constant section along its longitudinal development, similar to the section of the second end 12 and the median region 15 of the casing 10. Moreover, in correspondence of the seat 32 of the eccentric element 30, the second seat 5 has a hole 6 opened on the surface of the second panel 3 and adapted to allow the insertion of a manoeuvring tool 7 to rotate the eccentric element 30.

Advantageously, the hole 6 has a relatively small diameter, for example of about 5 mm.

Once inserted the connecting device 1 in the second seat 5, the first end 11 is inserted in the first seat 4 of first panel 2 until it abuts against the abutment flange 16.

The first housing 4 has an opening obtained on a main surface of the first panel 2 and extends perpendicularly to the surface of the panel 2 to a similar extent of the axial dimension of the first end 11 of the casing 10.

The first housing 4 has a substantially constant section along its longitudinal development, similar to the first end section 11.

As soon as the first and second panels 2, 3 are placed in the desired relative position, the eccentric element 30 is rotated around the main axis X, for example by means of the screwdriver 7 inserted in the seat 32 through the hole 6 in the first rotating direction, so that the tie rod 20 is moved along the longitudinal axis Y in the locking position.

Figure 5:
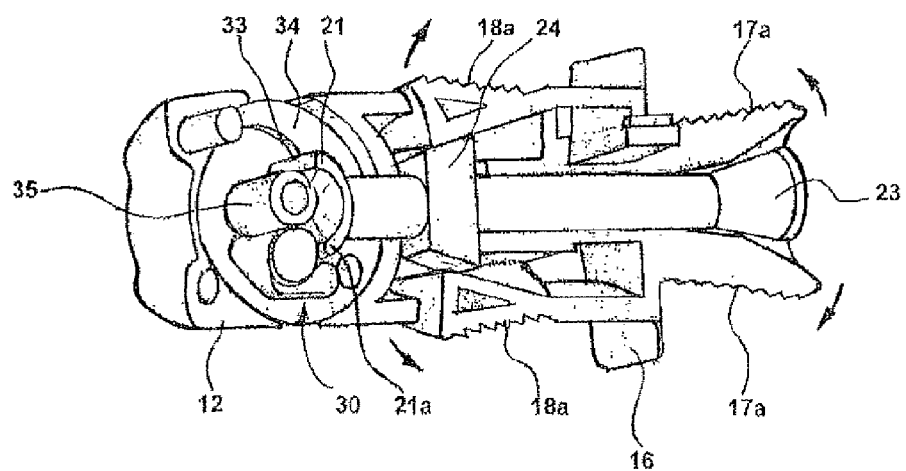
Figure 6:
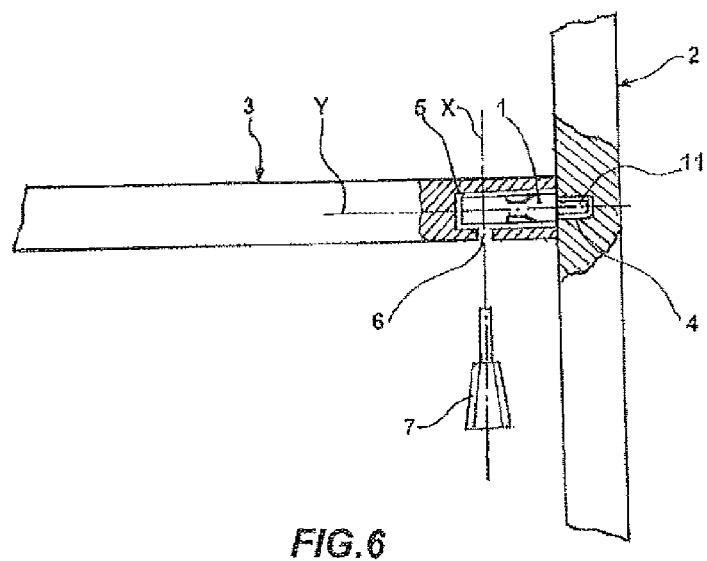
FIG. 6 is a schematic view of an assembling phase of two components of a piece of furniture in which the device of FIG. 1 is used.

Due to this displacement the first segment 23 and second segment 24 cause the opening oscillation of the tabs 17a and 18a respectively, resulting in a radial expansion of the casing 10 (FIG. 5).

The tabs 17a and 18a, thanks to the toothed profile of their outer surface, engage on the inner walls of the first and the second seat 4, 5 respectively.

Note that, advantageously, the oscillation of the tabs 17a and 18a takes place in the opposite mutual rotating direction, in a way as to stress the first and the second panel 2 and 3 mutually approaching, and tighten them.

To decouple the first and second panel 2 and 3, it is sufficient to rotate the eccentric element 30 in the opposite direction. Due to this rotation, the abutment element 35 pushes the tie rod 20 away from the locking position bringing it back in the release position. The tabs 17a and 18a are thus free to oscillate towards the longitudinal axis Y, so as to disengage the inner walls respectively of the first and the second seat 4 and 5.

Figure 7:
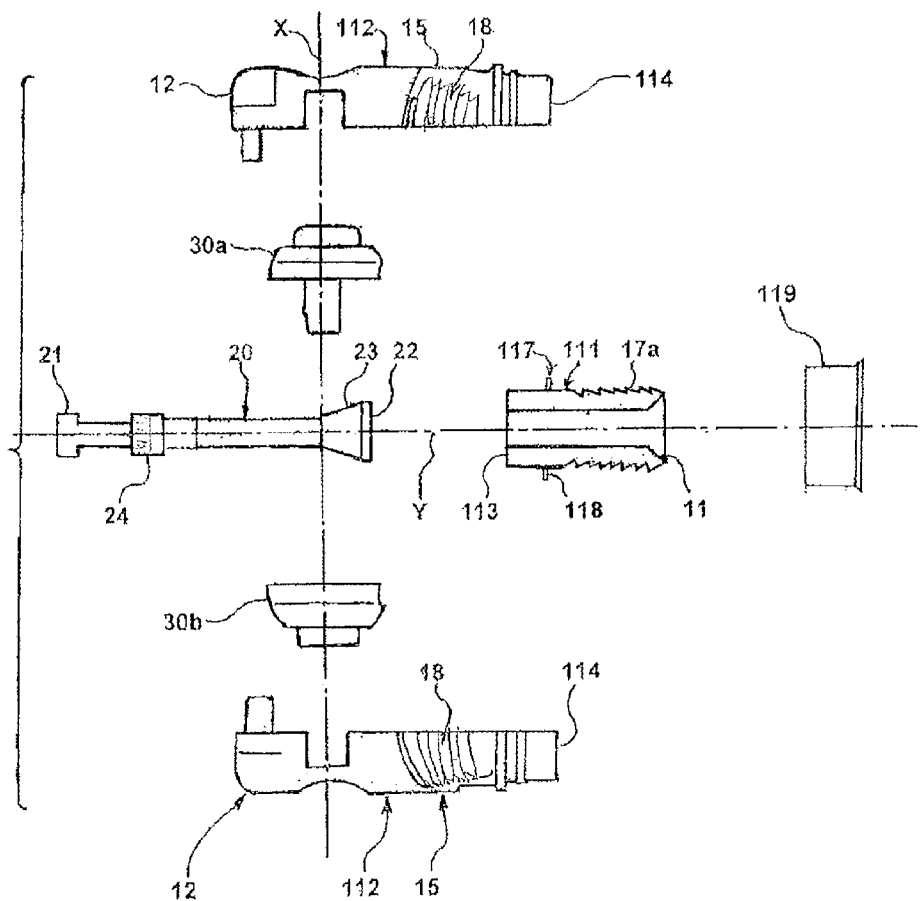
FIG. 7 is a schematic exploded view of a second example of the connecting device according to the present invention.
Figure 8:
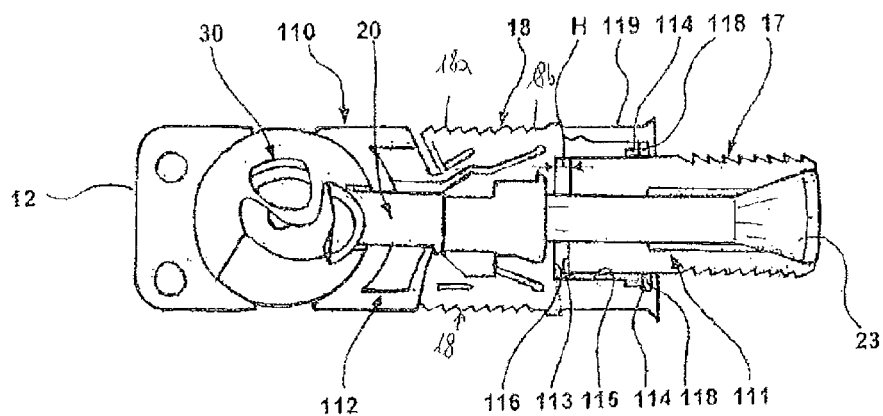
FIG. 8 is a longitudinal sectional view of the connecting device of FIG. 7.
Figure 9:
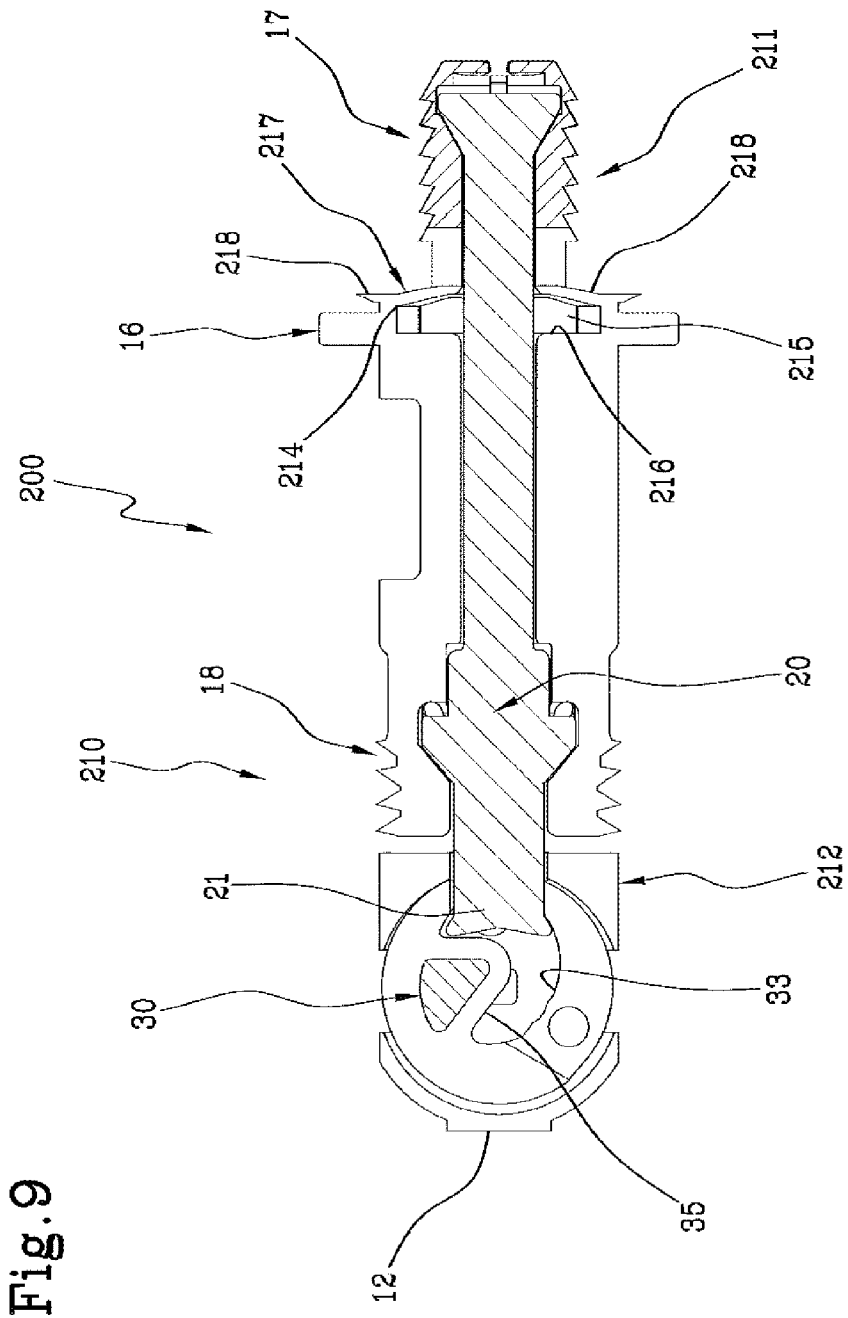
FIG. 9 is a longitudinal sectional view of a third embodiment of the connecting device according to the present invention.
Figure 10:
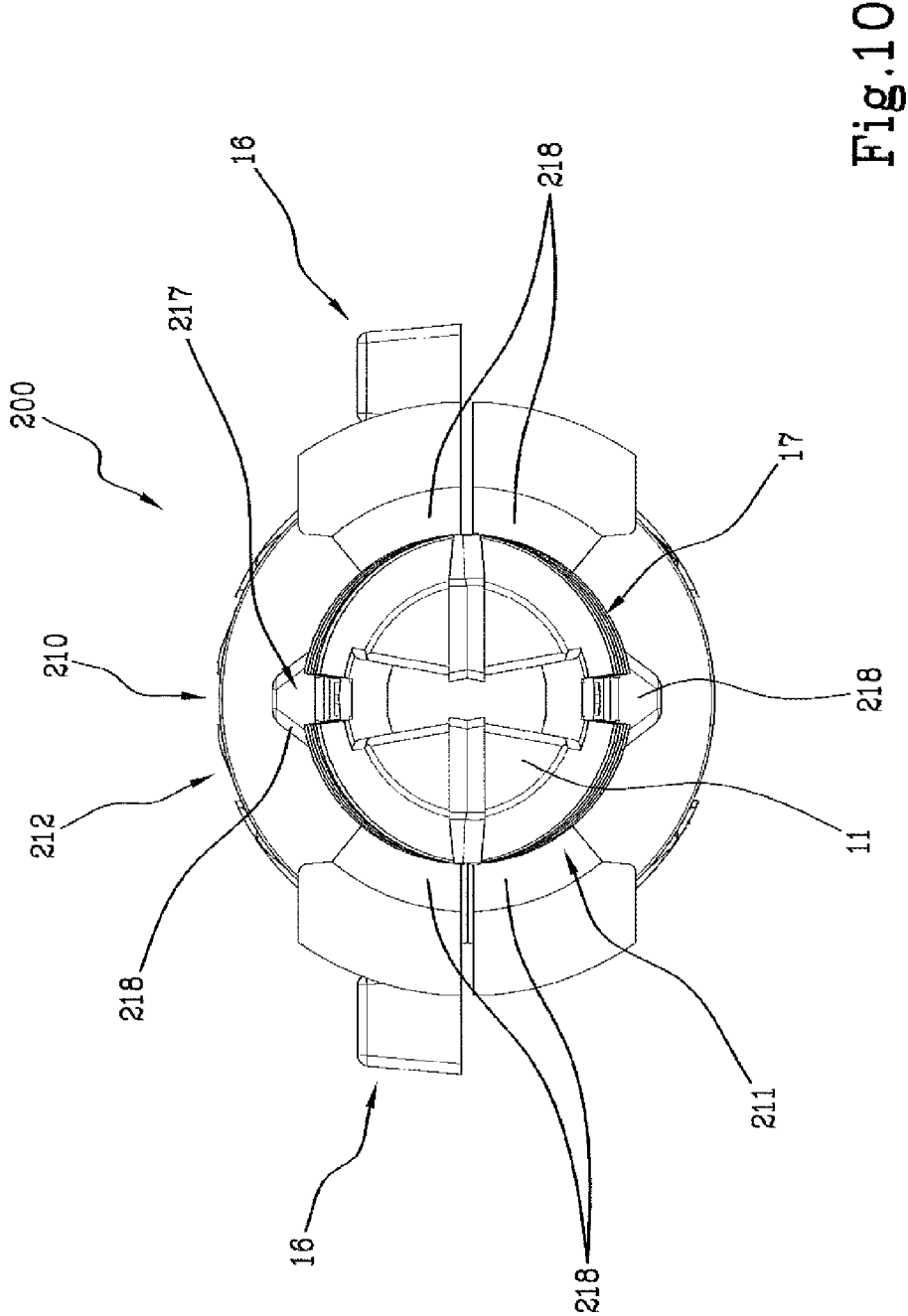
FIG. 10 is a front view of the device of FIG. 9.

With reference to FIGS. 7 and 8, 100 is generally referred as a second example of the connecting device made in accordance with the present invention, while with reference to FIG. 9 a third example of device is indicated with 200.

Components of the connecting devices 100, 200 similar to those described in detail in the example of the previous connecting device, are indicated with the same reference number or they are not mentioned, if not necessary (such as the flange 16).

The connecting devices 100, 200 differ from the connecting device 1 for a different configuration of some parts of the casing, while the tie rod and the eccentric element are substantially similar.

Each connecting device 100 or 200 comprises a casing 110, 210 including a first component 111, 211 (or first portion 111, 211) and a second component 112, 212 (or second portion 112, 212), which, in certain operational conditions, have limited mutual movement capabilities along the longitudinal axis Y in order to obtain the clamping of the first and of the second component of the piece of furniture 2 and 3.

Note that the expressions "first component" and "second component" do not mean that the casing 110, 210 is made of two distinct or separate bodies, but the aim is to define the different functionality of the two components which, in fact, may be made of one single component and be two separate bodies.

The first component 111, 211 is associated with the first radially expandable region 17 and includes the first end 11 of the casing 110, 210 which is intended to be received in the first seat 4 of the first component 2 of the piece of furniture.

The first component 111, 211 includes several tabs 17a, in a similar way to the casing 10, as well as one end 113, 213, axially opposite to the first end 11, not expandable.

The second component 112, 212 is associated with the second region 18 and includes the second end 12 and the median region 15 of the casing 110.

The second component 112, 212, in correspondence of one end 114 longitudinally opposed to the second end 12, an axial seat 115, 215 is obtained which is susceptible to receive the end 113, 213 of the first component 111, 211 having limited possibilities of sliding. The axial seat 115, 215 is open toward the end 114, 214 and is bounded on the opposite side by a shoulder 116, 216.

The first component 111, 211 is axially translatable with respect to the second component 112, 212 between a mounting position (shown in FIGS. 8 and 9), in which the first component 111, 211 is axially spaced from the second component 112, 212, and a clamping position in which the first component 111, 211 is approached to the second component 112, 212, at an axial distance lower than the first measurement.

In particular, in the mounting position, the end 113, 213 of the first component 111, 211 is received in the seat 115, 215 at a default measure H, for example in the range of 1.5 and 2 mm, from the shoulder 116, 216 while in the clamping position, the end 113, 213 of the first component 111, 211 is abutted against the shoulder 116, 216.

The casing 110, 210 further includes a provisional restraining element 117, 217 arranged between the first component 111, 211 and the second component 112, 212 to allow the displacement along the longitudinal axis Y of the first component 111, 211 compared to the second component 112, 212 from the mounting position to the clamping position.

According to a preferred aspect of the invention, the provisional restraining element 117, 217 is arranged in order to allow the translation only when the first component 111, 211 is stressed towards the second component 112, 212 with a minimum predefined axial force.

Preferably, this minimum axial force is defined by the axial force exerted by the tie rod 20 to obtain the radial expansion of the first region 17.

In other words, the provisional restraining element 117, 217 is configured to preserve the mutual axial position between the first 111, 211 and the second component 112, 212 during the expansion of the first radially expandable region 17.

Preferably, the provisional restraining element 117, 217 is configured to preserve the mutual axial position between the first 111, 211 and the second component 112, 212 until the complete expansion of the first radially expandable region 17.

Therefore, the provisional restraining element 117, 217 is a resilient spacer element, i.e. deformable, following the achievement of a predetermined axial force (i.e. thrust).

In the preferred version herein described and illustrated, the provisional restraining element 117, 217 includes one or more resilient tabs 118, 218, extending radially from the first component 111, 211 in an intermediate position between the end 113, 213 and the first region 17.

These tabs 118, 218 are thus interposed between the first 111, 211 and the second component 112, 212, preferably between the end 113, 213 and the first region 17, and configured to maintain said first 111, 211 and second component 112, 212 in a predetermined axial position.

The term "resilient" indicates, in the spirit of the present invention, that the structure and/or composition of the tabs 118, 218 is such that upon reaching a predetermined axial force acting between the first 111, 211 and the second component 112, 212, mutually approaching, said tab deforms or breaks, allowing a displacement of the second component 112, 212 approaching the first 111, 211.

Therefore, the tabs 118, 218 can be either flexible or frangible.

In the preferred embodiment, said tabs 118, 218 are flexible, which allows to obtain a complete reversibility of the axial movement between the first 111, 211 and the second component 112, 212.

Alternatively, however, tabs 118, 218 may be frangible, resulting also functional and conceptually similar to the previous, at least for the first use.

Structurally, the resilient tabs 118, 218 have an increased diameter of the seat 115, 215 so that, in the mounting position, they are abutted against the end 114, 214 of the second component 112, 212, preventing the further insertion of the first component 111, 211 inside the seat 115, 215. In particular, the axial distance between the tabs 118, 218 and the end 113, 213 is lower than the axial distance between the end 114, 214 and the shoulder 116, 216, so that in the assembly position, the end 113, 213 is spaced from the shoulder 116, 216 of the extent desired H, as previously explained.

In the embodiment of FIG. 8, the housing 110 further comprises a closing sleeve 119, coupled via screwing or snap or any other type of coupling, on the second component 112, in order to retain the resilient tabs 118 against the end 114.

In assembly of the first and of the second component of the piece of furniture 2 and 3, the connecting devices 100, 200 operate in the following manner.

The positioning of the connecting device 100, 200 occurs in a similar way to that of the connecting device 1 previously described.

In this configuration the tie rod 20 is moved to the release position, with the first and the second region 17, 18 in non-expanded configuration, and with the first component 111, 211 in the assembly position, with the resilient tabs 118, 218 abutted against the end 114, 214 of the second component 112, 212 and the end 113, 213 spaced from the shoulder 116, 216.

When the tie rod 20 is moved towards the locking position by the action of the eccentric element 30, the first and the second region 17 and 18 of the casing are radially expanded respectively by the action of the first and the second segment 23, 24 of the tie rod 20.

In this first phase of the displacement of the tie rod, the axial force exerted by the tie rod 20 on the first component 111, 211 is lower than the minimum axial force necessary to deform the resilient tabs 118, 218, therefore maintaining the distance H between the first 111, 211 and the second component 112, 212.

When the radial expansion, in particular of the first region 17 is substantially completed, with the tabs 17a engaged against the inner wall of the first seat 4, the further axial displacement of the tie rod 20 is obtained with a greater axial force which causes the deformation (bending or breaking) of the resilient tabs 118, 218 and the axial translation of the first component 111, 211 within the seat 115, 215 until the end 113, 213 abuts against the shoulder 116, 216.

Thanks to this operation, the first component of the piece of furniture 2, anchored by the first region 17, is also moved closer to the second component of the mobile 3, anchored to the second region 18, obtaining an effective clamping of the elements.

It will be noted, advantageously, that the provision in the casing 110, 210 of the two components 111, 211 and 112, 212 having limited mutual movement capabilities and of the provisional restraining element 117, 217 that prevents said displacement until the overcoming of a certain minimum axial force, allows to obtain an effective clamping between components of furniture even in traditional connecting devices, in which the casing features a single radially expandable region, typically defined at the opposite end to the eccentric element.

The present invention thus solves the aforementioned problem with reference to the prior art, while offering several other benefits, including the fact of allowing a more rapid and safer use, with less possibilities of loss of parts, with excellent performance in terms of tensile strength, and with a net improvement of the aesthetics of the assembled piece of furniture.

The invention claimed is:

1. A connecting device between components of a piece of furniture, comprising:
    a casing extending along a longitudinal axis between a first end suitable for being received in a first seat of a first component of the piece of furniture and a second end suitable for being received in a second seat of a second component of the piece of furniture, the casing comprising a first region radially expandable to engage the first component via the first seat,
    a tie rod extending along the longitudinal axis and received inside the casing and being axially slidable with respect to the casing toward and from a locking position, the tie rod comprising a first section having an enlarged section suitable for engagement with the first region to provide a radial expansion of the casing at the first region when the tie rod is moved to the locking position,
    an eccentric element housed in the casing and arranged to engage a head of the tie rod to axially move the tie rod toward the locking position when the eccentric element rotates around a main axis of the eccentric element,
    wherein the casing comprises a second region radially expandable to engage the second component via the second seat and the tie rod comprises a second segment having an enlarged section suitable for engagement with the second region to provide a radial expansion of the casing at the second region when the tie rod is moved to the locking position;
    wherein each of the first region and the second region comprises a tab, and wherein, when the tie rod is moved to the locking position, the tab of the first region is swung in an opposite direction with respect to the tab of the second region, to mutually clamp the first component and the second component.

2. The connecting device according to claim 1, wherein the casing comprises:
    a first casing component associated with the first region,
    a second casing component associated with the second region, the first casing component being axially translatable with respect to the second casing component between a mounting position, in which the first casing component is axially spaced from the second casing component, and a clamping position in which the first casing component is axially approached to the second casing component,
    a provisional restraining element arranged between the first casing component and the second casing component and suitable for preserving a mutual axial position between the first casing component and the second casing component during an initial expansion phase of the first region.

3. The connecting device according to claim 2, wherein the provisional restraining element is a resilient spacer element.

4. The connecting device according to claim 2, wherein the first casing component is positioned in a seat of the second casing component with a limited range of axial sliding.

5. The connecting device according to claim 2, wherein the provisional restraining element comprises a flexible tab radially extending from the first casing component and abutted against the second casing component in the mounting position.

6. The connecting device according to claim 1, wherein the tab of the first region is articulated to oscillate around an end of the tab facing an opposite side to the first end.

7. The connecting device according to claim 1, wherein the tab of the second region is articulated to oscillate around an end of the tab facing the first end.

8. The connecting device according to claim 1, wherein the first region is defined in correspondence of the first end of the casing and the second region is defined in a median region of the casing.

9. The connecting device according to claim 1, wherein the eccentric element is housed inside the casing in correspondence to the second end.

10. The connecting device according to claim 1, wherein the eccentric element defines internally a reversible guide for the head of the tie rod and is shaped to act reversibly in thrust on the head of the tie rod both in a first direction, toward the locking position, and in a second direction opposite to the first direction, toward a release position.

11. The connecting device according to claim 10, wherein the eccentric element includes internally a seat for receiving the head delimited by a first segment and a second active segment obtained by opposite sides of the head of the tie rod and suitable for encountering the head respectively as a result of a rotation of the eccentric element around the main axis in a first rotating direction or in a second rotating direction, opposite to the first rotating direction.

12. The connecting device according to claim 1, wherein the eccentric element comprises:
  a cam surface suitable for encountering the head of the tie rod when rotated around the main axis in a first rotating direction to axially move the tie rod toward the locking position;
  an abutment element, suitable for encountering the head on an opposite side of the cam surface, to axially move the tie rod away from the locking position when the eccentric element is rotated around the main axis in the second rotating direction.

13. The connecting device according to claim 1, wherein the head of the tie rod includes a U-shape with at least one chosen from a concavity facing the main axis and an axial countersink.

14. The connecting device according to claim 1, wherein the casing includes an elliptical section with a minor axis parallel to the main axis.

15. The connecting device according to claim 1, wherein the casing comprises:
  a first casing component associated with the first region,
  a second casing component associated with the second region, the first casing component being axially translatable with respect to the second casing component between a mounting position, in which the first casing component is axially spaced from the second casing component, and a clamping position in which the first casing component is axially approached to the second casing component,
  a provisional restraining element arranged between the first casing component and the second casing component and suitable for preserving a mutual axial position between the first casing component and the second casing component during an initial expansion phase of the first region and until a complete expansion of the first region.

16. A connecting device between components of a piece of furniture, comprising:
  a casing extending along a longitudinal axis between a first end suitable for being received in a first seat of a first component of the piece of furniture and a second end suitable for being received in a second seat of a second component of the piece of furniture, the casing comprising a first region radially expandable to engage the first component via the first seat,
  a tie rod extending along the longitudinal axis and received inside the casing and being axially slidable with respect to the casing toward and from a locking position, the tie rod comprising a first section having an enlarged section suitable for engagement with the first region to provide a radial expansion of the casing at the first region when the tie rod is moved to the locking position,
  an eccentric element housed in the casing and arranged to engage a head of the tie rod to axially move the tie rod toward the locking position when the eccentric element rotates around a main axis of the eccentric element,
  wherein the casing comprises a second region radially expandable to engage the second component via the second seat and the tie rod comprises a second segment having an enlarged section suitable for engagement with the second region to provide a radial expansion of the casing at the second region when the tie rod is moved to the locking position;
  wherein the casing comprises:
    a first casing component associated with the first region,
    a second casing component associated with the second region, the first casing component being axially translatable with respect to the second casing component between a mounting position, in which the first casing component is axially spaced from the second casing component, and a clamping position in which the first casing component is axially approached to the second casing component,
    a provisional restraining element arranged between the first casing component and the second casing component and suitable for preserving a mutual axial position between the first casing component and the second casing component during an initial expansion phase of the first region;
  wherein the provisional restraining element comprises a flexible tab radially extending from the first casing component and abutted against the second casing component in the mounting position.

* * * * *